United States Patent
Chitre et al.

(10) Patent No.: US 7,441,153 B1
(45) Date of Patent: Oct. 21, 2008

(54) METHOD AND SYSTEM FOR SECURE AND RELIABLE EVENT LOGGING

(75) Inventors: Amol R. Chitre, Sunnyvale, CA (US); Rimas A. Svarcas, Sunnyvale, CA (US); Daniel W. Ting, Palo Alto, CA (US)

(73) Assignee: Network Appliance Inc., Sunnyvale, CA (US)

( * ) Notice: Subject to any disclaimer, the term of this patent is extended or adjusted under 35 U.S.C. 154(b) by 545 days.

(21) Appl. No.: 11/092,225

(22) Filed: Mar. 28, 2005

(51) Int. Cl.
*G06F 11/00* (2006.01)
(52) U.S. Cl. .......................... 714/38; 726/26
(58) Field of Classification Search ............ 714/20, 714/18, 19, 25, 38; 726/26, 27
See application file for complete search history.

(56) References Cited

U.S. PATENT DOCUMENTS

| | | | | |
|---|---|---|---|---|
| 5,832,515 | A * | 11/1998 | Ledain et al. | 707/202 |
| 6,125,392 | A * | 9/2000 | Labatte et al. | 709/224 |
| 6,247,149 | B1 * | 6/2001 | Falls et al. | 714/45 |
| 7,188,220 | B2 * | 3/2007 | Spiegel | 711/155 |
| 7,240,368 | B1 * | 7/2007 | Roesch et al. | 726/23 |
| 2003/0055809 | A1 * | 3/2003 | Bhat | 707/1 |
| 2004/0260733 | A1 * | 12/2004 | Adelstein et al. | 707/202 |
| 2005/0091229 | A1 * | 4/2005 | Bali et al. | 707/100 |
| 2005/0262170 | A1 * | 11/2005 | Girkar et al. | 707/204 |

OTHER PUBLICATIONS

Casey, E. "Error, uncertainty, and loss in digital evidence." Intl Journal of Digital Evidence. Summer 2002, vol. 1, Issue 2.*
Gerhards, R. et al. "Remotely monitoring IIS log files." retrieved from "www.monitorware.com/Common/en/SecurityReference/Monitoring-IIS-Logs.pdf" on Jun. 9, 2008.*
Snodgrass, R. et al. "Tamper detection in audit logs." Proc. of the 30th VLDB Conf. Toronto, Canada, 2004.*

* cited by examiner

*Primary Examiner*—Robert Beausoliel
*Assistant Examiner*—Philip Guyton
(74) *Attorney, Agent, or Firm*—Blakely, Sokoloff, Taylor & Zafman LLP

(57) ABSTRACT

A method and system for secure and reliable event data logging are disclosed. In accordance with an embodiment of the invention, event data is generated for events relating to backup, or archiving, operations. The event data is appended to the log file. However, during the operation to append the event data to the log file, the appending operation is monitored to determine whether the event logging operation is successful. If the event logging operation is unsuccessful, the event data is retained in memory until the event data can be successfully appended to the log file.

24 Claims, 4 Drawing Sheets

METHOD AND SYSTEM FOR SECURE AND RELIABLE EVENT LOGGING

TECHNICAL FIELD

The present invention relates generally to event logging, and in particular, to a method and system for secure and reliable event logging in data backup systems.

BACKGROUND

In many industries, such as the financial services and healthcare industries, enterprises are compelled by strict records-retention regulations to archive important data, including: emails, documents, patient records, audit information, as well as other types of data. In some cases, archiving the data is not enough. Some records-retention regulations require that event logs, which include system data about archiving operations, also be retained. If backup data is found to be missing for some unexplained reason, an event log may indicate whether the data was properly archived to begin with. For example, an event log may include data about archiving operations, such as: the date and time an archival backup operation occurred; details about the particular data that was backed up; the location where the backup data was written; the user-id of the person who initiated the backup operation; and, whether the backup operation completed successfully. The data in an event log may prove critically important in the case of an internal investigation, or an investigation initiated by a government agency. Therefore it is necessary to ensure the integrity of logged event data, by ensuring that logged event data is complete, accurate, and verifiable.

Many traditional event logging systems have been designed to aid information technology personnel in troubleshooting situations, but these traditional event logging systems do not provide the reliability and security required to meet the requirements of strict records-retention regulations. One of the more common problems with traditional event logging systems is the possibility of losing event data in a log file. For example, in a traditional event logging system, event data may be lost in a number of situations, including when a system administrator inadvertently creates a new log file having the same name as a previous log file, resulting in existing event data being overwritten with new event data.

Another situation in which data may be lost is when a log volume (e.g., a volume storing one or more log files) has insufficient disk space to store new event data. For example, typically after a backup operation occurs, event data will be generated and appended to a log file of a log volume. If, however, the log volume is full, the event data may not be successfully appended to the log file. Consequently, important event data may be lost.

Another problem with traditional event logging systems is that they are susceptible to tampering. For example, many traditional event logging systems do not adequately protect log files from being modified or deleted by users. In an attempt to thwart an investigation, a user may delete incriminating archived data and then modify or delete the corresponding event data in the log file to make it appear as though the deleted archived data never existed. Alternatively, a user may generate false backup data and then append false event data to a log file, making it appear as though the archived data is the result of a legitimate backup operation.

SUMMARY OF THE DESCRIPTION

A method and system for securely and reliably logging event data are provided. According to an embodiment of the present invention, a data storage system generates event data associated with a backup operation. Prior to appending the event data to a log file, the data storage system compares the actual size of the log file to the size of the log file as indicated in a size field in a header of the log file. If the actual size of the log file is the same as the size stored in the size field of the log file header, indicating that the log file has not been tampered with, the data storage system appends the data to the log file.

Other aspects of the invention will be apparent from the accompanying figures and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for securely and reliably logging event data are described. In the following description, for purposes of explanation, numerous specific details are set forth in order to provide a thorough understanding of the present invention. It will be evident, however, to one skilled in the art that the present invention may be practiced without these specific details.

One embodiment of the present invention seeks to meet the many challenges posed by the numerous and widely varying records-retention regulations that are imposed on enterprises in certain industries. For example, such records-retention regulations include, but are not necessarily limited to: SEC Rule 17a-4, regulating broker-dealers; Health Insurance Portability and Accountability Act (HIPAA), regulating companies in the healthcare industry; Sarbanes-Oxley, regulating publicly traded companies; 21 CFR Part 11, regulating certain companies in the life sciences industry; and, DOD 5015.2-STD, regulating certain government organizations. Accordingly, an embodiment of the present invention provides secure and reliable event data logging. For example, in one embodiment of the present invention, event data is retained in memory when it cannot be immediately appended to a log file due to a volume reaching its maximum capacity. In another embodiment of the invention, log files are generated with unique names based on a secure system clock and a unique system handle to avoid inadvertently overwriting event data. In addition, in one embodiment, during each operation to append event data to a log file, the actual size of the log file is compared with the size of the log file as indicated by a size field in the header of the log file.

Although the present invention is described herein in the context of meeting the requirements of records-retention regulations, it will be appreciated that the present invention may find practical application in other situations where secure and reliable event logging are desirable. Furthermore, although the present invention is described in the context of a data backup system, it will be appreciated that the present invention may be adapted to work equally well with a wide variety of event logging systems.

Figure 1:
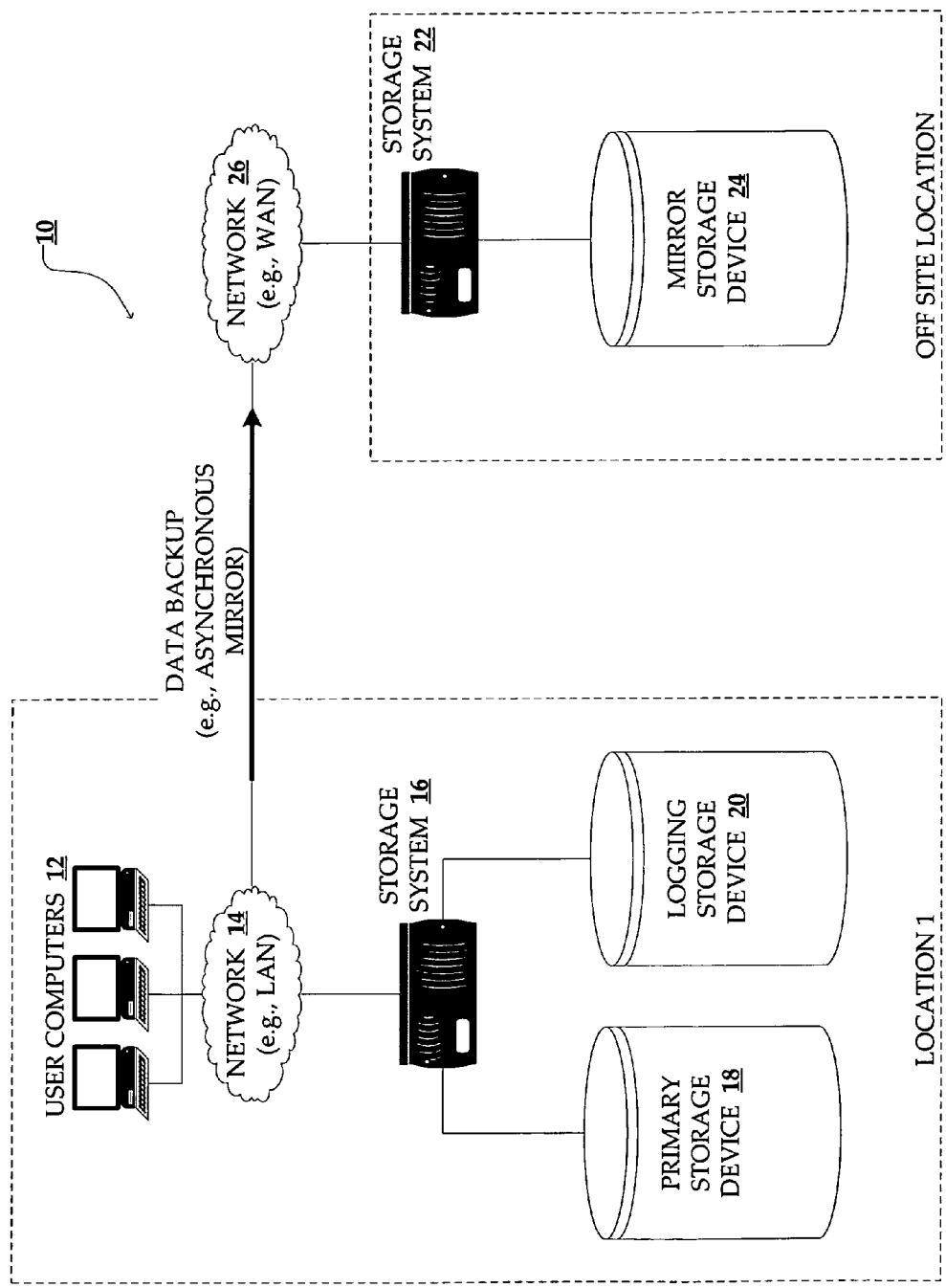
FIG. 1 illustrates an example of a network environment with a data storage system configured for event logging according to one embodiment of the invention.

FIG. 1 illustrates an example of a network environment 10 with a data storage system configured for event logging according to one embodiment of the invention. As illustrated in FIG. 1, several user computers 12 are connected via a network 14 to a storage system 16. The storage system 16 has two attached data storage devices, including: a primary data storage device 18, and a logging data storage device 20. Applications executing on the user computers 12 may store application data (e.g., emails, documents, etc.) on the primary data storage device 18 of the storage system 16.

According to one embodiment of the invention, an administrator may utilize an application to select how frequently a backup operation should occur. The application may work in conjunction with the storage system 16. For example, the application may be a client application used by an administrator to configure backup operations on the storage system 16. In any case, in one embodiment of the invention, a "snapshot" of the primary storage device 18 may be captured on a periodic basis. It will be appreciated by those skilled in the relevant art, that a snapshot is a representation of a file system at a given moment in time. For example, snapshots are incremental backup images that only capture data that has been modified since the most recent previous backup image. In a snapshot-based backup application, rather than copying an entire image of a volume for each backup operation, the volume to be backed up is analyzed for changes, and only disk blocks that have changed are captured.

In addition, the system illustrated in FIG. 1 includes an off-site storage system 22 with a data mirror storage device 24 connected to the first storage system 16 via a wide area network (WAN) 26. The mirror storage device 24, as the name suggests, may be configured as a data mirror of the primary storage device 18. Accordingly, the system may be configured so that data on one or more volumes of the primary storage device 18 is periodically copied via the WAN 26 to one or more volumes on the mirror storage device 24. Such a configuration is commonly referred to as an asynchronous data mirror.

According to one embodiment of the invention, each time a backup operation is initiated to copy application data from the primary storage device 18 to the mirror storage device 24, the storage system 16 generates data related to the backup operation (e.g., event data). The event data may include a wide variety of information regarding the backup operation, including but not limited to: the date and time an archival backup operation was initiated; details about the particular application data that was backed up; the location (e.g., storage device, volume and pathname of a log file) where the backup data was written; the user-id of the person who initiated the backup operation; and, whether the backup operation was successfully completed.

After the storage system 16 generates the event data, the storage system 16 may append the event data to an existing log file on a storage device, such as the logging storage device 20. Furthermore, during the operation to append the event data to the log file, the storage system 16 may monitor the operation to append. That is, the storage system 16 may monitor the operation to append event data to the log file to determine whether or not the event data was successfully appended to the log file. For example, if the storage device on which the log file resides has reached its maximum capacity, then the storage system 16 may retain the event data in memory until such time as the storage system 16 is able to successfully append the event data to the log file.

In one embodiment of the invention, before event data is appended to a log file, the event data is formatted to properly comply with one or more records-retention regulations. Furthermore, in one embodiment of the invention, event data is generated for each backup operation that is required by one or more records-retention regulations to have corresponding event data written to a log file. For example, some records-retention regulations require event data to be logged for certain events, such as a backup operation that archives data to a secondary storage device. Accordingly, in one embodiment of the invention, event data is logged for each backup operation that is required, by regulation, to have associated event data logged.

In one embodiment of the invention, the log files are kept on a separate volume, or volumes, referred to as log volumes. Furthermore, as illustrated in FIG. 1, the log volumes may be kept on separate storage devices. For example, the log volumes may be kept on storage devices that are different from those storage devices containing the volumes used to store the application data and the backup data. Therefore, if a problem occurs with the storage device holding the backup data, the log files will be preserved and may at least give some insight as to what data was on the backup volume, or the mirror storage device 24.

It will be appreciated that the particular configuration of the data storage system illustrated in FIG. 1 is provided only as an example. The present invention may be adapted to, and utilized with, a wide variety of data storage systems, and software applications other than those specifically described herein. For example, in an alternative embodiment of the invention, the primary data storage device 18, and the logging data storage device 20 may be connected to separate storage systems. In another embodiment of the invention, one or more of the storage devices 18, 20 and 24 may be implemented as a storage area network (SAN) connected to the storage system 16 via a data-switching device, such as a fibre channel switch (not shown). Accordingly, the storage system 16 may be capable of providing client applications executing on the user computers 12 block level access to the storage devices making up the SAN.

Figure 2:
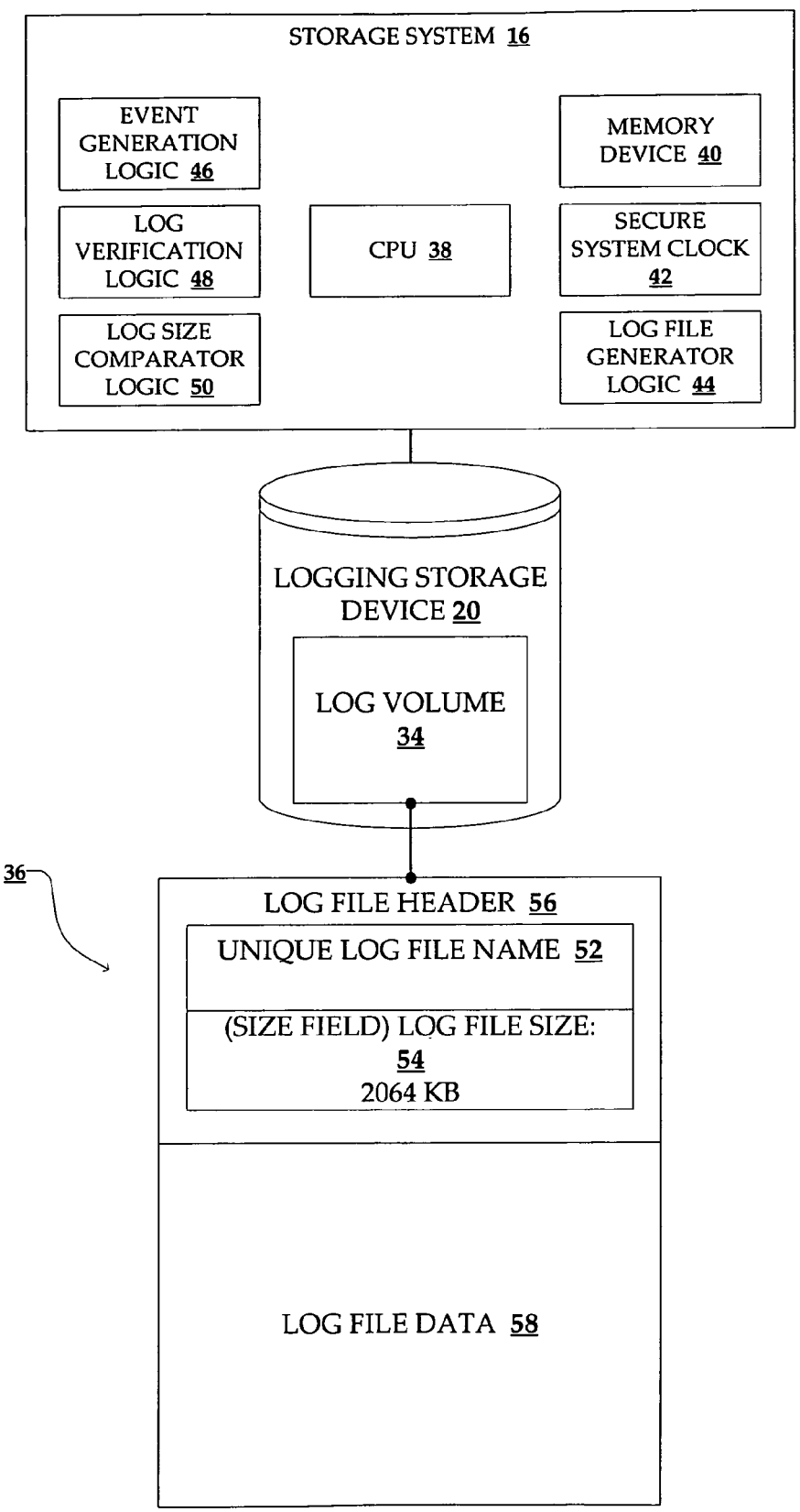
FIG. 2 illustrates an example of a storage system, according to an embodiment of the present invention, for securely and reliably logging event data.

FIG. 2 illustrates an example of a storage system 16, according to an embodiment of the present invention, for securely and reliably logging event data. As illustrated in FIG. 2, the storage system 16 is attached to a storage device 20, which includes a log volume 34. In turn, the log volume 34 includes a log file 36. In one embodiment of the invention, the log file 36 includes a log file header 56 and log file data 58.

It will be appreciated by those skilled in the relevant art that the various logical components illustrated in FIG. 2 may be implemented in software, hardware, or a combination of software and hardware. For example, in one embodiment of the invention, the event generation logic 46, log verification logic 48, log size comparator logic 50, and log file generator logic 44 are comprised of a series of instructions stored on disk (not shown) or in the memory device 40. Accordingly, when such instructions are executed by the CPU 38, the instructions cause the system to perform a series of operations, as described in greater detail below.

As illustrated in FIG. 2, in addition to a central processing unit (CPU) 38 and a memory device 40, the storage system 16 includes a secure system clock 42, and log file generator logic 44. In one embodiment of the invention, the log file generator logic 44 generates log files with unique log file names 52. For example, in one embodiment, each log file is given a unique name based on the system time from the secure system clock 42, and a unique system handle. The unique system handle may be based on the i-node number of the log file, as well as a generation number, and a unique volume UID. Furthermore, in one embodiment of the invention, an ordinary user of the system cannot manipulate or tamper with the secure system clock 42. Instead, only a user with special administrative privileges can manipulate the system time on the secure system clock 42.

Referring again to the storage system 16 illustrated in FIG. 2, the storage system 16 also includes event generation logic 46 and log verification logic 48. In one embodiment of the invention, the event generation logic 46 of the storage system 16 generates event data corresponding to events related to backup operations. In addition the event generation logic 46 may append the event data to a log file 36 on a log volume 34 of a logging storage device 20. In one embodiment of the invention, during the operation to append the event data to the log file 36, the log verification logic 48 determines whether the event data was successfully appended to the log file 36. For example, if the event data is not successfully appended to the log file 36, the event generation logic may cause the event data to be retained in the memory device 40 of the storage system until such time that the event data can be successfully appended to the log file 36. In addition, a message may be communicated to an administrator indicating that event data was generated but not successfully logged.

In the event of a reboot, various information not retained in persistent storage will be lost. This can include information about running events, information about to be logged, or information that could not be logged previously. After a reboot, the system logs a message indicating the event of a reboot, so that it is clear that one or more operations may not have been logged properly. No new events are allowed to begin until this reboot log message has been successfully written to the log volume.

After the event generation logic 42 has appended the event data to the log file 36, in one embodiment of the invention, the event generation logic 36 may update a size field 54 in the log file header 56 of the log file 36 to reflect the size of the log file including the new event data. For example, in one embodiment, the event generation logic adds the size (e.g., number of bytes) of the newly appended event data to the current size (e.g., number of bytes) of the log file and writes the sum of the two to the size field 54 of the log file header 56. Consequently, if a user fraudulently appends data to the log file without properly updating the log file size, the storage system 16 may detect the discrepancy the next time event data is appended to the log file. A secure logging application must prevent this type of fraudulent activity. For example, in one embodiment of the invention and as illustrated in FIG. 2, the storage system 16 includes log size comparator logic 50. Accordingly, in one embodiment of the invention, prior to appending any event data to the log file 36, the log size comparator logic 50 compares the actual size of the log file 36 with the size of the log file 36 as indicated by the size field 54 of the log file header 56. If, for example, the actual size of the log file differs from the size as indicated by the size field 54, the discrepancy may indicate that someone has tampered with the log file. In one embodiment of the invention, the storage system 16 may prohibit further backup operations until the discrepancy is repaired. In an alternative embodiment, the storage system 16 may generate a warning that may be communicated to a systems administrator upon detection of a size discrepancy, and begin writing to a new, unaffected log file.

Figure 3:
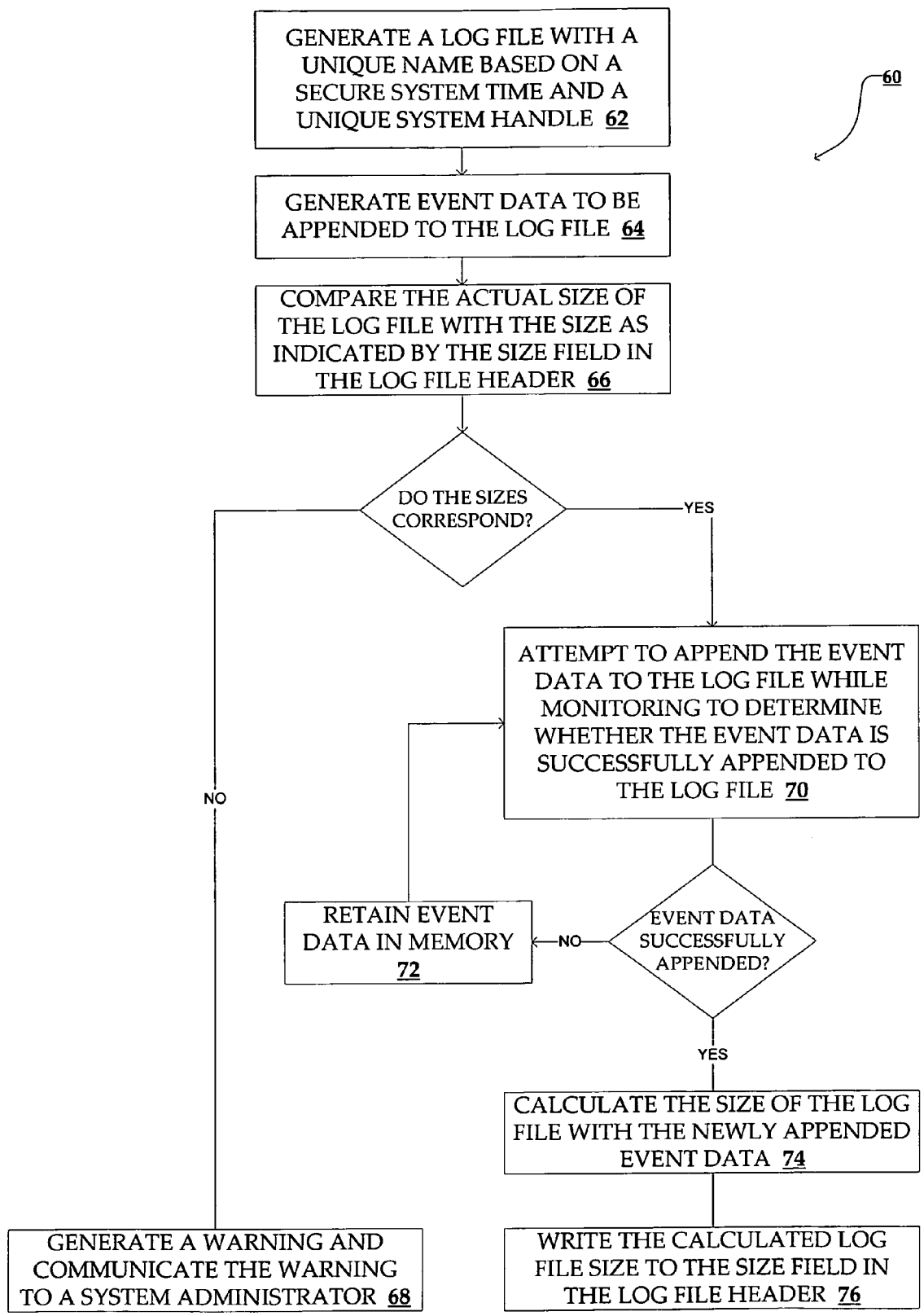
FIG. 3 illustrates the operations for a method, according to one embodiment of the invention, for securely and reliably logging event data; and, FIG. 4 shows a diagrammatic representation of a machine in the exemplary form of a computer system within which a set of instructions, for causing the machine to perform any one or more of the methodologies discussed herein, may be executed.

FIG. 3 illustrates the operations for a method, according to one embodiment of the invention, for securely and reliably logging event data. At operation 62, a log file is generated with a unique name based on a secure system time and a unique system handle. Then, at operation 64, event data corresponding to an event related to a backup operation is generated. At operation 66, prior to attempting to append the event data to the log file, the actual size of the log file is compared with the size of the log file as indicated by a size file in the log file header. If the sizes do not correspond, then at operation 68 a warning is generated to indicate that the log file may have been tampered with. Accordingly, the warning may be communicated to a system administrator.

However, if the actual log file size corresponds with the size as indicated in the log file header, then at operation 70, an attempt to append the event data to the log file is made. Accordingly, the operation 70 to append the data is monitored to determine whether the event data is successfully appended to the log file. If the event data is not successfully appended to the log file, for example because the disk on which the log volume resides is full, then at operation 72 the event data is retained in memory until the event data can be successfully appended to the log file.

If at operation 70 the event data is successfully appended to the log file, then at operation 74 the size of the log file, including the newly appended data, is calculated. Then, at operation 76, the calculated log file size is written to the size field of the log file header. Until the event logging operation has completed, no new operations are allowed. For example, new operations are blocked from executing until previous operations have been properly logged.

Figure 4:
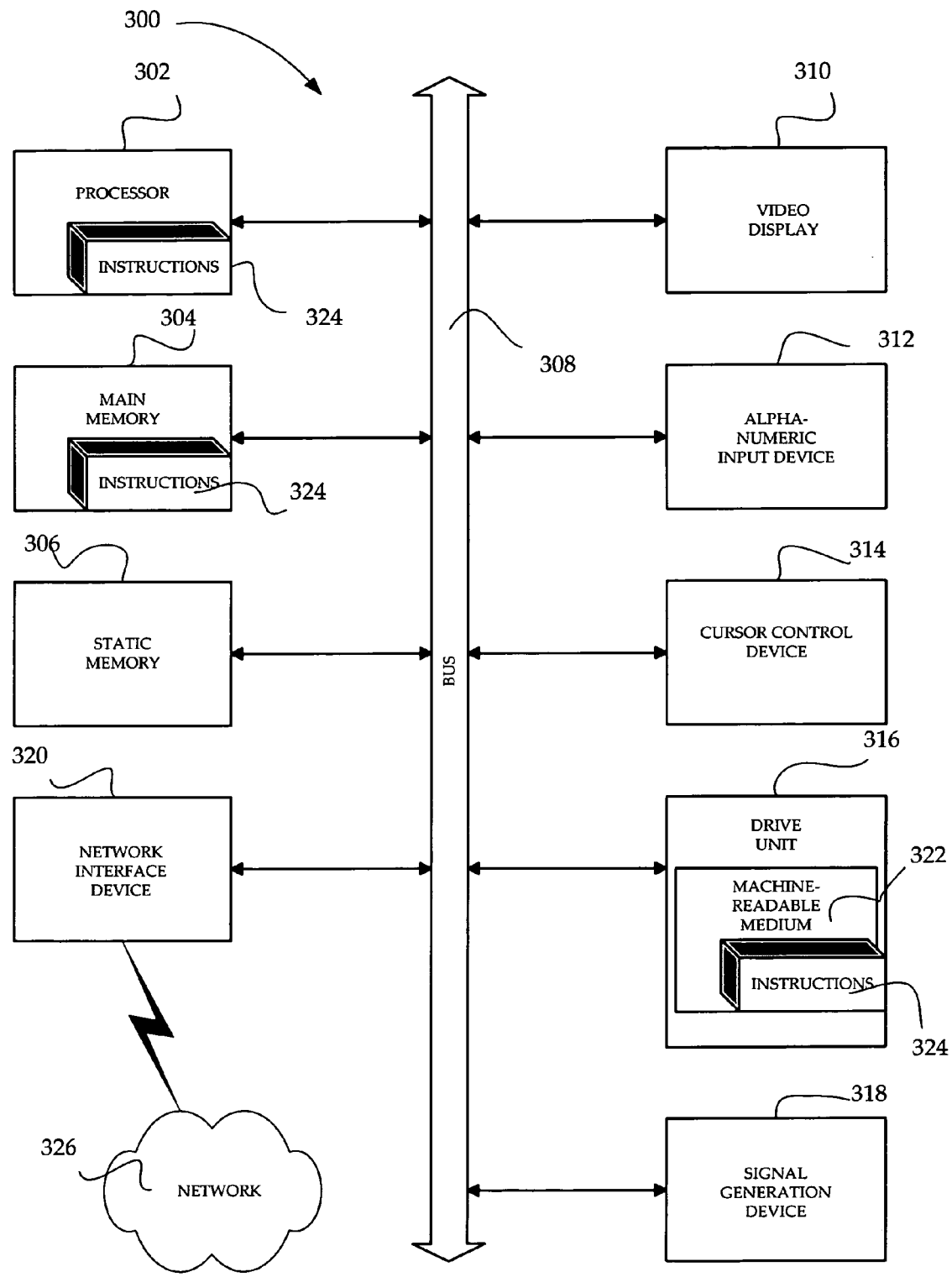

FIG. 4 shows a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320, including a data switching device such as a fibre channel switch (not shown).

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, a method and system for securely and reliably logging event data have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for logging event data, the method comprising:
   generating event data to be appended to a log file;
   prior to appending the event data to the log file, comparing the actual size of the log file with the size of the log file as indicated by a size field in a header of the log file; and
   appending the event data to the log file only if the actual size of the log file is equal to the size of the log file as indicated by the size field in the header of the log file.

2. The method of claim 1, further comprising:
   after appending the event data to the log file, calculating the size of the log file including the newly appended data; and
   writing the calculated size of the log file, including the newly appended data, to a size field in a header of the log file.

3. The method of claim 1, further comprising:
   during the operation to append the event data to the log file, determining whether the event data was successfully appended to the log file; and
   if the event data was not successfully appended to the log file, retaining the event data in memory until the event data can be successfully appended to the log file.

4. The method of claim 1, further comprising:
   if the event data is not successfully appended to the log file prior to a re-boot operation, upon completion of the re-boot operation, preventing all backup operations and all logging operations until a re-boot event has been successfully logged.

5. The method of claim 1, wherein the event data includes data relating to a backup operation involving the copying of data from a primary data storage device to a secondary data storage device.

6. The method of claim 5, wherein appending the event data to the log file includes writing the event data to the log file in a format that complies with one or more records-retention regulations.

7. The method of claim 5, wherein event data is generated for each backup operation that is required by one or more records-retention regulations to have corresponding event data written to a log file.

8. The method of claim 5, further comprising:
   prior to generating event data to be appended to a log file, generating a log file on a log volume of a storage device other than the primary storage device or the secondary storage device.

9. The method of claim 8, wherein generating a log file on a log volume of a storage device other than the primary storage device or the secondary storage device includes naming the log file with a unique name based on a time-stamp from a secure system clock and a unique system handle.

10. The method of claim 9, wherein the secure system clock is protected from tampering by a user of the system.

11. The method of claim 9, wherein the unique system handle is based on an inode number, a generation number, and a volume UID.

12. A system for logging event data, the system comprising:
   a first storage device to store a log file;
   a storage system, the storage system comprising:
   a CPU;
   a memory device;
   event generation logic to generate event data and to append the event data to the log file, wherein, after appending the event data to the log file, the event generation logic is to calculate a size of the log file, including any newly appended event data, and write the calculated size of the log file, including any newly appended data, to a size field in a header of the log file; and
   log size comparator logic to compare an actual size of the log file with the calculated size of the log file as indicated by the size field in the header of the log file.

13. The system of claim 12,
   wherein the event generation logic is to append the event data to the log file only if the actual size of the log file is equal to the size of the log file as indicated by the size field in the header of the log file.

14. The system of claim 12, further comprising:
   log verification logic to determine whether the event data was successfully appended to the log file, wherein, if the verification logic determines the event generation logic was unsuccessful in appending the event data to the log file, the event generation logic is to retain the event data in the memory device until the event data can be successfully appended to the log file.

15. The system of claim 12, wherein if the event data is not successfully appended to the log file prior to a re-boot operation, upon completion of the re-boot operation, the log verification logic is to prevent all backup operations and all logging operations until a re-boot event has been successfully logged.

16. The system of claim 12, wherein the event data includes data relating to a backup operation involving the copying of data from a primary storage device to a secondary storage device.

17. The system of claim 16, wherein the event generation logic is to append the event data to the log file in a format that complies with one or more records-retention regulations.

18. The system of claim 16, wherein the event generation logic is to generate event data for each backup operation that is required by one or more records-retention regulations to have corresponding event data written to a log file.

19. The system of claim 16, wherein the storage system further comprises:
   log file generation logic to generate a log file on a log volume of the first storage device.

20. The system of claim 19, wherein the log file generation logic is to name the log file with a unique name based on a time-stamp from an secure system clock and a unique system handle.

21. The system of claim 20, wherein the secure system clock is protected from tampering by a user of the system.

22. The system of claim 21, wherein the unique system handle is based on an inode number, a generation number, and a volume UID.

23. A machine-readable medium embodying instructions for facilitating the logging of event data, the instructions, when executed by a machine, cause the machine to:
   generate event data to be appended to a log file;
   prior to appending the event data to the log file, compare the actual size of the log file with the size of the log file as indicated by a size field in a header of the log file; and
   append the event data to the log file only if the actual size of the log file is equal to the size of the log file as indicated by the size field in the header of the log file.

24. The machine-readable medium of claim 23, embodying further instructions to:
   after appending the event data to the log file, calculate the size of the log file including the newly appended data; and
   write the calculated size of the log file, including the newly appended data, to a size field in a header of the log file.

* * * * *